United States Patent
Ribera et al.

(10) Patent No.: US 6,603,503 B1
(45) Date of Patent: Aug. 5, 2003

(54) METHODS, SYSTEMS AND DEVICES FOR DISPLAYING LIVE 3-D, PARALLAX AND PANORAMIC IMAGES

(75) Inventors: John F. Ribera, Howell, NJ (US); Minakanagurki V. Ranganath, Holmdel, NJ (US)

(73) Assignee: Avaya, Inc., Lincroft, NJ (US)

( * ) Notice: Subject to any disclaimer, the term of this patent is extended or adjusted under 35 U.S.C. 154(b) by 0 days.

(21) Appl. No.: 09/441,997

(22) Filed: Nov. 18, 1999

(51) Int. Cl.$^7$ ............................................. H04N 13/02
(52) U.S. Cl. ...................................................... 348/48
(58) Field of Search ............................... 348/48, 42, 46, 348/47, 36–39; H04N 13/02, 15/00

(56) References Cited

U.S. PATENT DOCUMENTS

| | | | | |
|---|---|---|---|---|
| 4,914,284 A | * | 4/1990 | Halldorsson et al. | 250/206.2 |
| 5,004,328 A | * | 4/1991 | Suzuki et al. | 359/664 |
| 5,023,709 A | * | 6/1991 | Kita et al. | 348/164 |
| 5,241,369 A | * | 8/1993 | McNeil et al. | 356/445 |
| 5,495,576 A | * | 2/1996 | Ritchey | 345/420 |
| 5,606,167 A | * | 2/1997 | Miller | 250/390.04 |
| 5,612,533 A | * | 3/1997 | Judd et al. | 250/208.1 |
| 5,703,604 A | * | 12/1997 | McCutchen | 345/8 |
| 6,002,430 A | * | 12/1999 | McCall et al. | 348/143 |
| 6,003,998 A | * | 12/1999 | St. Hilaire | 359/366 |
| 6,064,399 A | * | 5/2000 | Teo | 345/629 |
| 6,070,583 A | * | 6/2000 | Perelman et al. | 600/310 |
| 6,133,945 A | * | 10/2000 | Stuettler | |
| 6,326,994 B1 | * | 12/2001 | Yoshimatsu | |
| 6,400,396 B1 | * | 6/2002 | Bowker et al. | |

* cited by examiner

*Primary Examiner*—Nhon Diep
(74) *Attorney, Agent, or Firm*—Troutman Sanders LLP (57) ABSTRACT

Live, three-dimensional ("3-D") parallax and panoramic images are displayed using novel detection and processing devices, systems and methods. A spherical lens and spherical charge-coupled device ("CCD") detects live, 3-D panoramic images. Image and positioning sweep generators are adapted to process the detected, 3-D images and to generate a novel, video signal. The video signal is then formatted so that it can be displayed. The live, 3-D parallax and panoramic images displayed using the video signal comprise images from a substantially 360°×360° range of angles. In addition, multiple detection units can be combined allowing multiple live, 3-D parallax and panoramic images to be displayed simultaneously.

132 Claims, 5 Drawing Sheets

METHODS, SYSTEMS AND DEVICES FOR DISPLAYING LIVE 3-D, PARALLAX AND PANORAMIC IMAGES

BACKGROUND OF THE INVENTION

Video cameras are used to record and transmit images, such as live sporting events. Live images are transmitted from traditional video cameras which are fixed, relative to the scene they are recording and transmitting, at certain camera angles. Distinct from an image captured from a single camera angle are panoramic images. Panoramic images are typically generated using a number of camera angles. To date, there has been no known live transmission or reception of panoramic images. The display of panoramic images has been limited to non-live video films, such as those seen at various science and historical museums throughout the United States. These non-live, panoramic films have been created using a number of existing techniques. The first technique involves recording images on a film moving in one direction while a camera moves in an opposite direction. The second technique involves rotating a camera through the angles 0 to 360 degrees in a single plane, all the while taking "still" images at each angle. These are just two examples. Other techniques exist, but it would be impractical to discuss each and every one of them in a few short paragraphs. In every case, however, existing techniques either require the movement of a camera or the movement of the film/storage mechanism in order to create and store panoramic images. None of these existing techniques involve the display of live, 3-D panoramic images.

In addition, none of the existing techniques involve the display of live, 3-D "parallax" images. Parallax images are created by the human visual system. To accurately reproduce images this parallax effect must be taken into account.

Accordingly, it is an object of the present invention to provide for devices and methods for displaying live, 3-D parallax and panoramic images over a substantially 360°×360° range of angles.

It is another object of the present invention to provide devices and methods for displaying a plurality of live parallax and panoramic images from more than one viewpoint, It is yet a further object of the present invention to generate novel video signals from live 3-D panoramic images.

Other objectives, features and advantages of the present invention will become apparent to those skilled in the art from the following description taken in conjunction with the accompanying drawings.

SUMMARY OF THE INVENTION

In accordance with the present invention there are provided methods, systems and devices for generating video signals which can be used to display live, 3-D parallax and panoramic images.

One such device comprises a novel spherical lens and spherical charge-coupled device for detecting live, 3-D images over a 360°×360° range of angles. The detected images are then broken up into positioning and image data. This data is swept by novel positioning and image sweep generators. The output of the sweep generators is an unformatted video signal.

The unformatted video signal is then formatted to create a novel, composite video signal. The composite video signal is then used to display live, 3-D parallax and panoramic images.

The present invention and its advantages can be best understood with reference to the drawings, detailed description of the preferred embodiments and claims that follow.

DETAILED DESCRIPTION OF THE INVENTION

Figure 1:
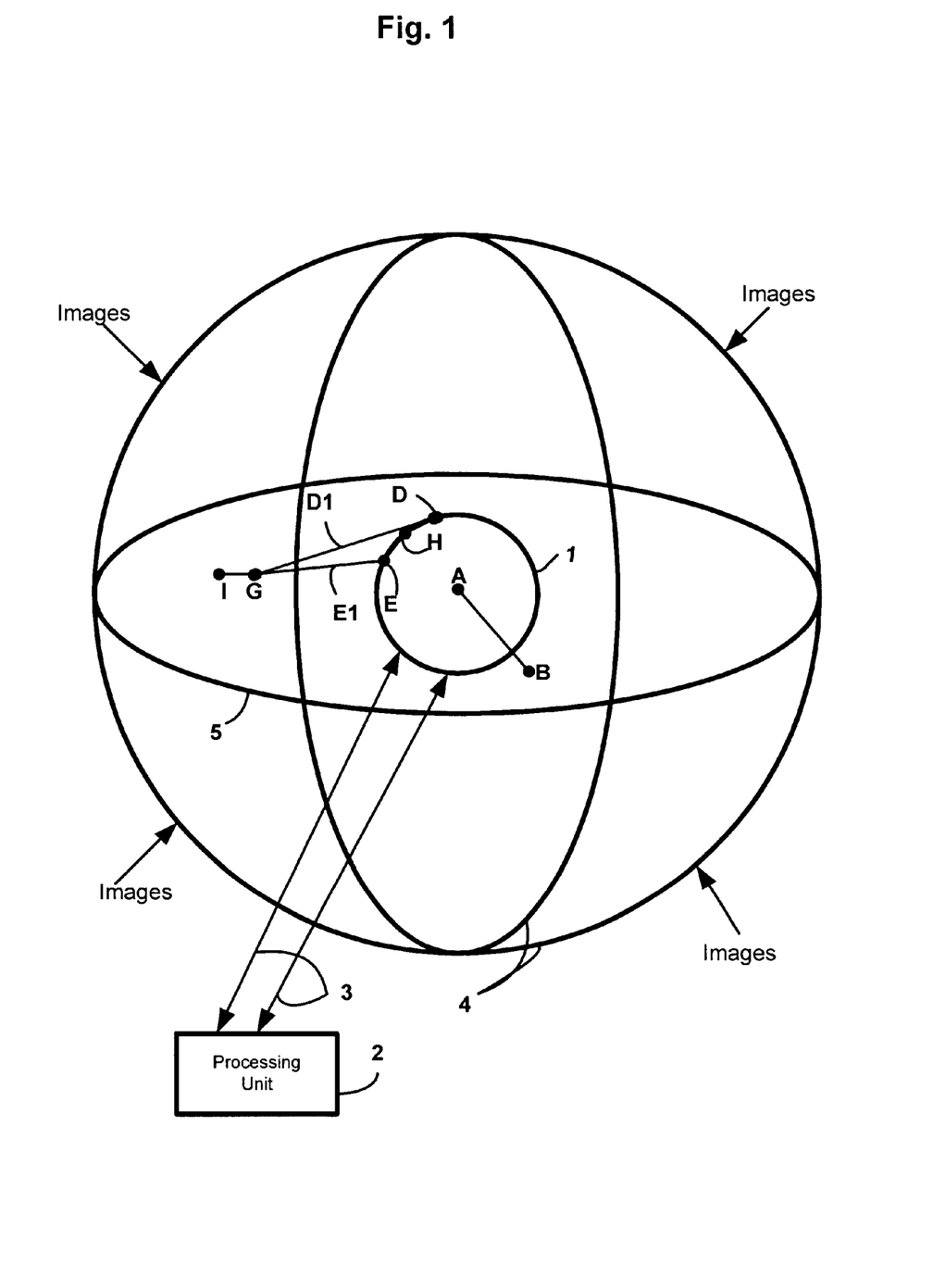
FIG. 1 depicts a detection unit for detecting live, 3-D panoramic images over a 360°×360° range of angles according to one embodiment of the present invention.

Referring to FIG. 1, there is shown a detection unit or means 1 adapted to detect live, 3-D panoramic images over a substantially 360°×360° range of angles. The detection unit 1 is adapted to detect light images originating from objects which surround the unit 1 and impinge upon the surface of the detection unit 1, for example, at points "D" and "E". The detection unit 1 is centered at a position "A". In addition to detecting images originating from surrounding objects, the detection unit 1 can be further adapted to generate image and positioning data indicating the image content and the image's position along the circumference of the detection unit 1. In an illustrative embodiment of the invention the detection unit 1 comprises a spherical detection unit, such as a spherical CCD or the like and a spherical lens or the like. In one embodiment of the invention, the spherical lens is adapted to focus images from surrounding objects onto the spherical CCD. Thereafter, the spherical CCD is adapted to convert the images into video and positioning data. The present invention envisions the use of a novel spherical lens and CCD. The spherical lens and CCD combination are adapted to detect the widest possible viewing angle. The spherical lens may be constructed using holographic technology or other technology adapted to produce left eye (abbreviated "LE") and right eye (abbreviated "RE") images. More will be said about LE and RE images below. Though it is assumed for the present discussion that the images detected are from a part of the visible spectrum, the present invention is not so limited. Images based on any frequency or wavelength of light along the electromagnetic spectrum, such as infrared and ultraviolet light, may be detected by a detection unit adapted to detect such light.

In an illustrative embodiment of the invention, the range of angles detected by the detection unit 1 is 360°×360°. It should be realized, however, that the detection unit can detect any range of angles less than 360°×360° as well.

Continuing, the detection unit 1 is further adapted to transmit the positioning and image data to processing unit or means 2 via pathway 3. Once this data is received by the processing unit 2, the processing unit 2 is adapted to generate live, 3-D parallax and panoramic images based on images from position "A". At position "A", a plurality of images are generated covering a 360°×360° range of angles. It should be understood that lines 4 and 5 shown in FIG. 1 are for illustrative purposes only. These lines illustrate the fact that the detection unit 1 is capable of detecting live, 3-D panoramic images from all angles surrounding the unit 1. Though shown as hard-wired to processing unit 2, it should be understood that the detection unit 1 may be adapted to transmit data via wireless transmissions or the like. In still another embodiment of the invention, the detection unit 1 is adapted to optically transmit data to processing unit 2 with little or no delay.

Detection unit 1 must operate using some known means of power. If power is supplied via a hard-wired electrical cord then the position where the power cord connects to the detection unit 1 creates a "blind spot". That is, the surface of the detection unit which is adapted to receive the power cord cannot be used as a lens or CCD. Therefore, images originating from objects which would normally be detected at this position will escape detection causing a blind spot or "gap" in the range of angles detectable by the detection unit 1. In illustrative embodiments of the invention, the processing unit 2 or detection unit 1 may be adapted to compensate for the existence of this blind spot.

The present invention makes it possible to display live, 3-D parallax and panoramic images using the positioning and image data. For example, suppose an object located at position "G" in FIG. 1 is fixed and the detection unit 1 is also fixed and centered around position "A". Though the detection unit 1 is centered around position "A" it is adapted to collect images of the object located at position "G" from all angles. Any image which impinges on the circumference of the spherical lens and CCD will be captured by the detection unit 1. Thus, the detection unit 1 is capable of detecting multiple images of the same object located at "G". For example, different images of the same object located at "G", will be detected by the detection unit at points "D" and "E". The images reaching points "D" and "E" follow paths $D_1$ and $E_1$, respectively. After these images are detected they are then processed by the processing unit 2 to generate live, 3-D parallax and panoramic images.

Figure 2:
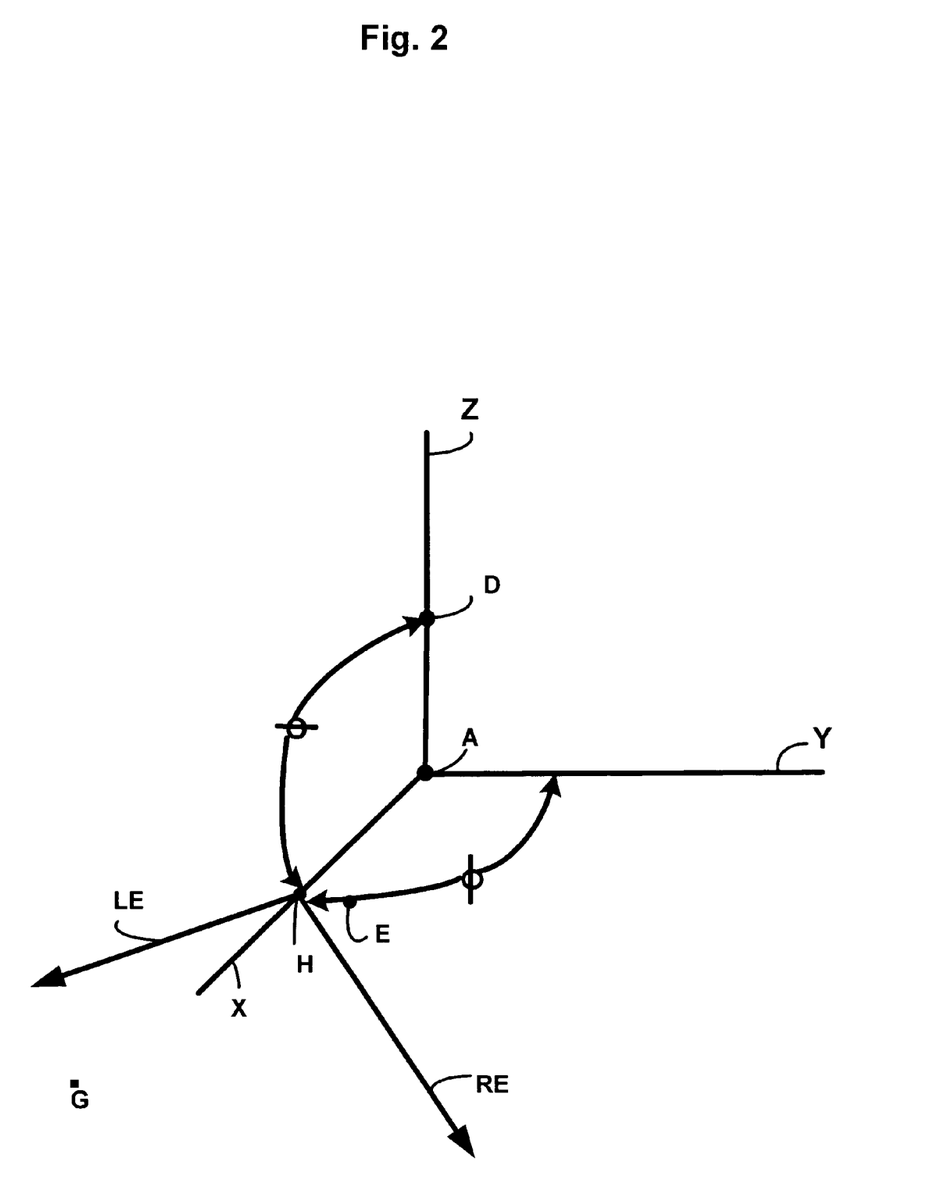
FIG. 2 illustrates how points located along the circumference of a detection unit, such as the unit shown in FIG. 1, can be determined by positioning angles "$\phi$" and "$\theta$" according to one embodiment of the present invention.

FIG. 2 shows a different view of the object located at "G". Angles "$\phi$" and "$\theta$" help determine the location of an image of the object located at "G" which impinges on a point located along the circumference of spherical detection unit 1. For this reason these angles will be referred to as positioning angles. The positioning data generated by detection unit 1 is derived from positioning angles "$\phi$" and "$\theta$".

A few more comments need to be introduced before a more detailed discussion of the detection unit 1 and processing unit 2 can begin. One comment concerns an issue related to mankind, namely, the fact that people who have two working eyes actually see two images; one image with their right eye and another with their left eye. These two images are processed by the brain to form one "parallax" image. To demonstrate this phenomena, close your left eye. Next, extend your right arm out so that your arm is perpendicular to your body. Then extend your right fore-finger so that it is pointing upwards. Your extended fore-finger should be visible to your right eye only at this point. Now close your right eye and open your left. You should see that the image of your fore-finger appears to move. In fact, the closer you move your finger to your nose the bigger the movement or shift appears to be. The present invention takes this phenomena into account.

Referring again to FIG. 2 there is shown a point "H" located along a spherical detection unit. At this point, and at each point along the circumference of the spherical detection unit having a clear line of sight, there exists two images of the object located at "G"; one RE image as seen by a right eye and one LE image as seen by a left eye. The RE and LE images are contained within the data which is transmitted to processing unit 2.

The present invention also envisions the generation of live, 3-D parallax and panoramic images from multiple detection units located at different reference viewpoints. For example, referring again to FIG. 1, suppose one detection unit is centered at point "A" and a second detection unit is centered at point "B". Both detection units are adapted to detect live, 3-D panoramic images of an object located at "G". Because they are located at two different reference viewpoints, however, the images detected will be different. The advantages of using multiple detection units can be further illustrated with reference to FIG. 3.

Figure 3:
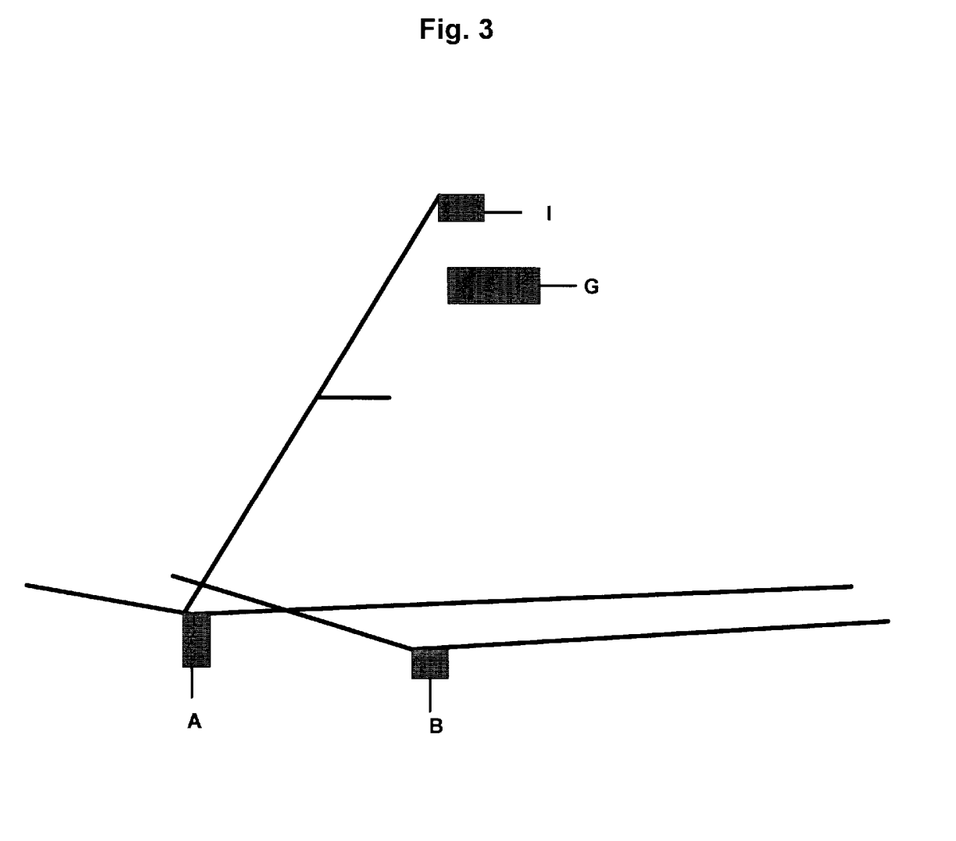
FIG. 3 depicts an example of how multiple detection units located at different viewpoints may be utilized to detect a plurality of live, 3-D panoramic images according to one embodiment of the present invention.

FIG. 3 depicts an object located at position "I" which is hidden from the detection unit located at position "B". However, if images from detection units located at positions "A", and "B" are combined, the object located at "I" will become visible. Said another way, the two images are combined to form an image of the object located at "I". Thus, the use of multiple detection units located at different viewpoints makes it possible to detect a plurality of live, 3-D panoramic images which may not be detectable by a single unit.

Figure 4:
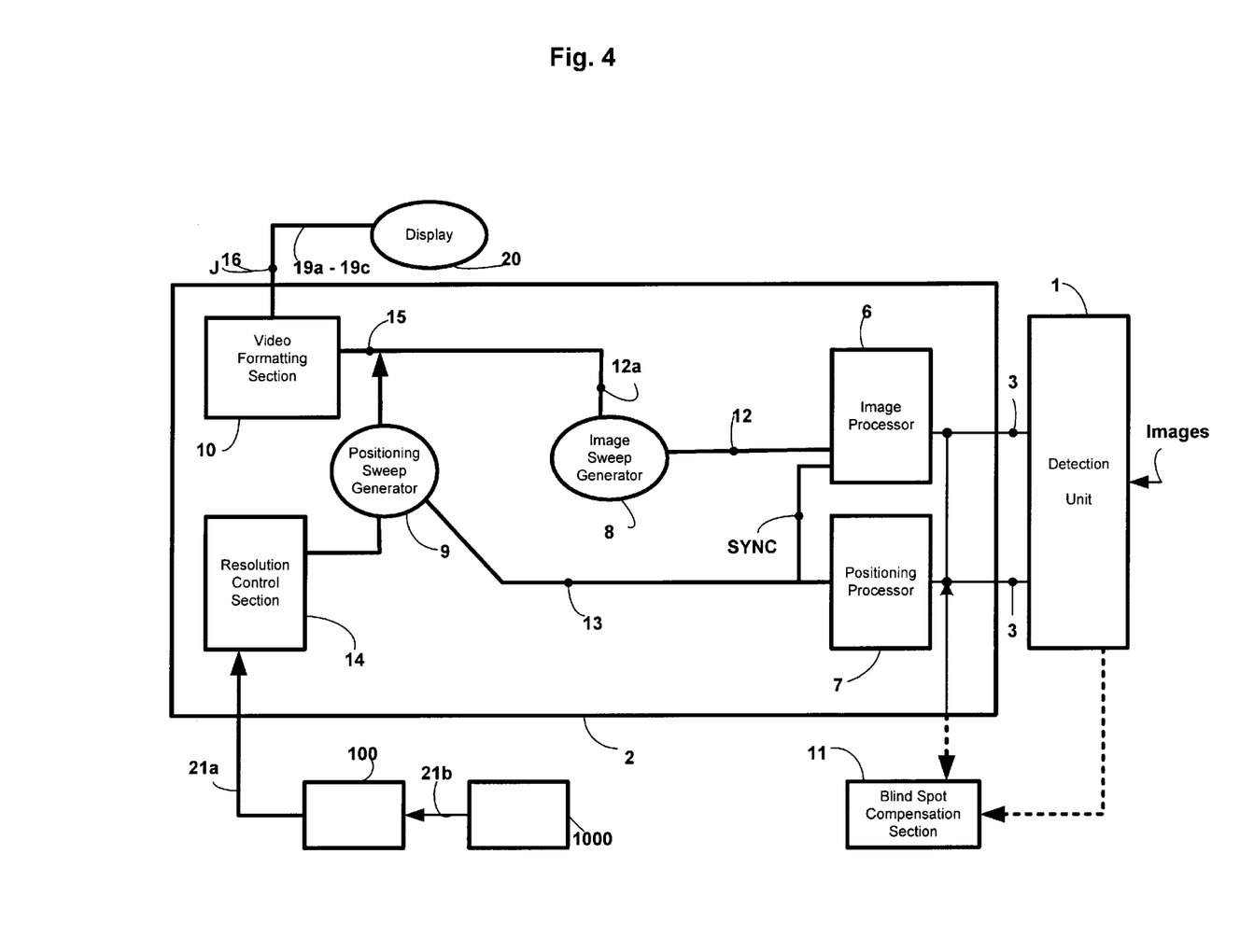
FIG. 4 depicts a block diagram of detection and processing units adapted to detect and generate live, 3-D panoramic images according to one embodiment of the present invention.

FIG. 4 depicts a block diagram of units used in the detection, processing and generation of live, 3-D images according to one embodiment of the present invention. As shown, the processing unit 2 comprises image processor or image processing means 6 and positioning processor or positioning processor means 7. The image processor 6 is adapted to receive data via pathway 3 from detection unit 1 and to generate 3-D image data 12 representative of RE and LE images or image data. In one embodiment of the invention, the image processor 6 comprises a 3-D parallax interpreter adapted to generate RE and LE image data. The same data input into image processor 6 is also input into positioning processor 7. The positioning processor 7 is adapted to receive the data and to generate positioning data 13 which correspond to the points along the circumference of detection unit 1 where live 3-D images are detected. These points correspond to the positions of objects which originate the images. In an illustrative embodiment of the invention the positioning processor 7 comprises a viewpoint, bias controller adapted to generate positioning data representative of points derived from positioning angles "$\phi$" and "$\theta$". Said another way, the image processor 6 generates the RE and LE image data 12 while the positioning processor 7 generates the "$\phi$" and "$\theta$" positioning data 13. The "$\phi$" and "$\theta$" data are used to insure that the image or images corresponding to a given point is inserted into its proper position in a composite video signal 19a output by the processing unit.

In an illustrative embodiment of the invention, the positioning processor 7 comprises a filter or filters, such as a window aperture, adapted to filter out either "$\phi$" or "$\theta$" positioning data, respectively. The data input into positioning processor 7 may comprise both horizontal ("$\phi$") and vertical ("$\theta$") positioning data for both a RE and LE image. To correctly display such signals, the positioning processor 7 must be adapted to filter out the horizontal data from the vertical and vice-versa. Window apertures, filters or the like can be used to achieve this function. The exact design or method of filtering may vary. For instance, a single, switchable filter may be used to filter out horizontal data followed by vertical data, or vice-versa. Or, a first filter may filter out horizontal data while a second filter filters out vertical data.

In an additional embodiment of the present invention, the positioning processor 7 further comprises an integrator. The integrator is adapted to integrate or otherwise link the positioning data (i.e, $\phi$, $\theta$) with the correct RE and LE image data.

In the beginning of this discussion we noted the existence of a "blind spot". To compensate for this blind spot the detection unit 1 or processing unit 2 (as indicated by dotted lines) comprises a blind spot compensation section or means 11 adapted to compensate for such a blind spot. The blind spot compensation section 11 is adapted to estimate positioning and image data corresponding to the position of the blind spot. When two detection units are used, positioning and image data corresponding to the blind spot can be estimated by using data from other units. In an illustrative embodiment of the invention, each detection unit or camera has a different blind spot. Suppose we are using three detection units. To estimate the positioning and image data which corresponds to the blind spot of the first unit we can use data taken from the second and third. Similarly, because the blind spot of the second unit is different than that of the first and third, we can estimate the positioning and image data corresponding to the second unit's blind spot using data from the first and third units, and so on. Though the compensation section 11 will typically be made a part of the detection unit 1 or processing unit 2, it should be understood that it may also be separated out as a separate unit.

The RE and LE 3-D image data 12 is sent to image sweep generator or means 8 which is adapted to generate a first, unformatted live 3-D video signal 12a from the RE and LE 3-D data 12 which falls within the adjustable "sweep" range of the sweep generator 8. The sweep generator 8 is then adapted to output the first 3-D video signal 12a. Similarly, the positioning data, i.e., "$\phi$" and "$\theta$", 13 is sent to positioning sweep generator or means 9 which is adapted to sweep or scan certain positions from among all of the positions lying on the circumference of detection unit 1. So it is clear, the "$\phi$" and "$\theta$" data 13 output from positioning processor 7 represents data from all of the points along the circumference of detection unit 1. At each point there is an image made up of RE and LE data. Only some of these points (i.e., a range of points) will be used to create a final live, 3-D image, however. In an illustrative embodiment of the invention the processing unit 2 further comprises resolution control section or means 14 adapted to control the "resolution" of any final live, 3-D parallax and panoramic image or images by controlling the sweep generator 9. The resolution of any final, live, 3-D parallax and panoramic image depends upon the range or number of points swept by the positioning sweep generator 9. The greater the number of points, the greater the resolution and vice-versa. In an alternative embodiment of the invention, the resolution control section 14 is adapted to control the positioning sweep generator 9 such that the sweep generator 9 only sweeps a certain range or number of points. In yet a further embodiment of the invention, the resolution control section 14 is adapted to control the sweep generator 9 according to stored reference point data. The reference point data may be stored in the resolution control section 14, in a memory device or in a combination of the two. The reference point data represents the resolution range of the processing unit 2. In sum, the resolution control section 14 determines which points will be swept by the sweep generator 9. In reality, the resolution control section 14 also determines which portion of the first, unformatted video signal 12a will be used to create a second, unformatted swept 3-D video signal 15. Only that portion of video signal 12a which corresponds to points which have been selected to be swept by sweep generators 8 and 9 will be used to create the second, unformatted video signal 15.

Generally, in a multiple detection unit/processing unit system, each detection unit/processing unit combination will use the same resolution but this need not be the case.

In an illustrative embodiment of the invention, the second 3-D video signal 15 generated by sweep generators 8,9 is input into a video formatting section or means 10. The formatting section is adapted to format the second, 3-D video signal so that it can be used to display a live, 3-D parallax and panoramic image or images 15. In an illustrative embodiment of the invention, a display unit or means 20 is adapted to display the formatted, live 3-D parallax and panoramic images. This display 20 may comprise a computer, television or other display, such as one found in a theater, adapted to receive the live, 3-D parallax and panoramic video signal.

Figure 5:
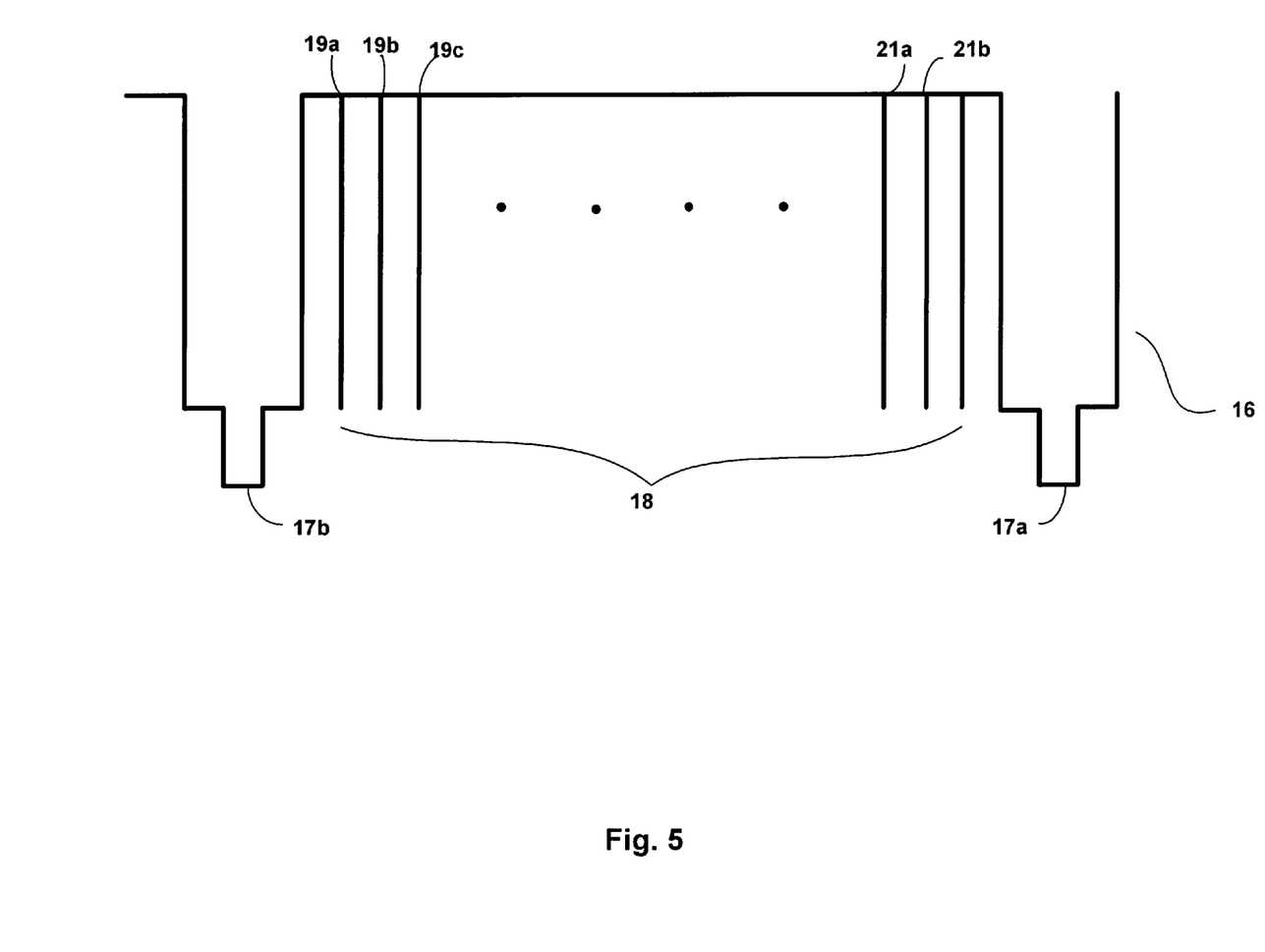
FIG. 5 depicts an example of a portion of a novel video signal according to one embodiment of the invention.

FIG. 5 depicts an example of a portion 16 of a novel composite video signal which is output at point "J" as a result of such formatting. The present invention envisions the generation of the novel, formatted composite video signal which can be used by a display 20 to receive and display a live, 3-D parallax and panoramic image or images. Signal portion 16 comprises a single scan line of the display 20. It should be understood that the processing unit 2 may be adapted to output any number of scan lines, however. As shown, the signal portion 16 comprises start and stop pulses 17a,17b. In between these two pulses is one video scan line 18. This single video scan line 18 may comprise a plurality of formatted video signals 19a–19c. For example, formatted composite video signal 19a may comprise a video signal from viewpoint "A", signal 19b from viewpoint "B" and signal 19c from still a third viewpoint.

In another embodiment of the invention, signal portion 16 comprises formatted composite video signals 21a and 21b from separate detection units 100,1000. In this manner, images from more than one detection unit may be displayed simultaneously. Each of the signals 19a–19c and 21a,21b comprises RE and LE data of an image relative to its position. Thus, live 3-D parallax panoramic images from more than one viewpoint and from more than one detection unit may be displayed. The processing unit 2 is adapted to produce a live, parallax and panoramic image or images from live, 3-D parallax and panoramic composite video signals 21a, 21b.

As shown in FIG. 4, the detection units 1, 100, 1000 may be "cascaded" together. In an illustrative embodiment of the invention, each detection unit 1, 100, 1000 is adapted to combine the signals from every other detection unit in order to generate a final image without any overlapping. In a sense, the final image is "stitched" together from each unit.

Though the terms detection unit, processing unit, spherical lens and spherical CCD have been used it should be understood that these components may be called by a more general term, such as a 3-D camera. It should also be understood that the sections making up the detection unit 1 and processing unit 2 may be combined or further broken down into additional sections. Further, parts or all of the detection unit 1 may be made a part of the processing unit 2, or vice-versa.

Though the discussion above involved the use of a single processing unit 2, image processor 6, positioning processor 7, sweep generators 8, 9 resolution control section 14, video formatting section 10 and display 20 it should be understood that the invention is not so limited. Though at least one of each of the above units/sections is needed to carry out its respective function, more than one of each unit/section may be used, such as when multiple detection units are cascaded. Similarly, one or more unformatted or formatted video signals may be generated by a system.

It is to be understood that changes and variations may be made without departing from the spirit and scope of this invention as defined by the claims that follow.

We claim:

1. A device for generating a live, three-dimensional parallax video signal comprising:
    a single substantially spherical, charge-coupled detection unit adapted to detect a live, three-dimensional image.
2. The device as in claim 1 wherein the detection unit comprises a spherical lens.
3. The device as in claim 1 wherein the detection unit comprises a spherical charge-coupled device.
4. The device as in claim 1 wherein the detection unit is adapted to detect live, three-dimensional images over a substantially 360°×360° range of angles.
5. The device as in claim 1 wherein the detection unit is adapted to detect the image in a visible spectrum.
6. The device as in claim 1 wherein the detection unit is adapted to detect the image in an infrared spectrum.
7. The device as in claim 1 wherein the detection unit is adapted to detect the image in an ultra-violet spectrum.
8. The device as in claim 1 wherein the detection unit comprises a holographic detection unit.
9. The device as in claim 1 wherein the detection unit is adapted to convert the detected image into image and positioning data.
10. The device as in claim 1 wherein the detection unit is adapted to convert the image into image and positioning data and is further adapted to transmit the image and positioning data to a processing unit.
11. The device as in claim 10 wherein the detection unit is adapted to wirelessly transmit the image and positioning data to the processing unit.
12. The device as in claim 10 wherein the detection unit is adapted to optically transmit the image and positioning data to the processing unit.
13. The device as in claim 12 wherein the detection unit is adapted to optically transmit the image and positioning data to the processing unit with substantially no delay.
14. The device as in claim 1 further comprising a compensation section adapted to estimate image and positioning data corresponding to a blind spot.
15. The device as in claim 1 further comprising a processing unit adapted to generate a live, three-dimensional composite video signal from the detected image.
16. The device as in claim 15 wherein the processing unit comprises an image processor adapted to generate three-dimensional image data from the detected image.
17. The device as in claim 16 wherein the image processor is further adapted to generate three-dimensional image data from the detected image which represents RE and LE image data.
18. The device as in claim 16 wherein the image processor comprises a three-dimensional parallax interpreter adapted to generate RE and LE image data.
19. The device as in claim 15 wherein the processing unit comprises a positioning processor adapted to generate positioning data corresponding to the detected image.
20. The device as in claim 19 wherein the positioning processor comprises a viewpoint bias controller adapted to generate the positioning data from positioning angles.
21. The device as in claim 19 wherein the positioning processor comprises a filter adapted to filter out horizontal or vertical positioning data associated with RE and LE images of the detected image.
22. The device as in claim 19 wherein the positioning processor comprises a first filter adapted to filter out horizontal positioning data associated with RE and LE images and a second filter to filter out vertical positioning data associated with the RE and LE images.
23. The device as in claim 22 wherein the first and second filters comprise window apertures.
24. The device as in claim 15 wherein the processing unit comprises an integrator adapted to link positioning data to RE and LE image data based on the detected image.
25. The device as in claim 15 wherein the processing unit comprises an image sweep generator adapted to generate a first, unformatted live 3-D video signal based on the detected image.
26. The device as in claim 25 wherein the processing unit further comprises a positioning sweep generator adapted to generate a second, unformatted live 3-D video signal from the first, unformatted video signal.
27. The device as in claim 26 wherein the processing unit is further adapted to generate the second, unformatted video signal based on a range of points associated with the detected image.
28. The device as in claim 27 wherein the processing unit further comprises a resolution control section adapted to select the range of points.
29. The device as in claim 28 wherein the resolution control section is adapted to select the range of points based on stored reference point data.
30. The device as in claim 15 wherein the processing unit further comprises a resolution control section adapted to control a resolution of a generated, live three-dimensional image based on the detected image.
31. The device as in claim 26 wherein the processing unit further comprises a video formatting section adapted to format the second, unformatted video signal.
32. The device as in claim 15 wherein the processing unit further comprises a video formatting section adapted to format a live, three-dimensional video signal based on the detected image.
33. The device as in claim 31 further comprising a display adapted to display a live, three-dimensional parallax image based on the formatted video signal.
34. The device as in claim 1 further comprising a display adapted to display a live, three-dimensional parallax image based on the detected image.
35. A system for generating live, three-dimensional parallax video signals comprising:
    a plurality of substantially spherical charge-coupled detection units, each unit adapted to detect a live three-dimensional image.
36. The system as in claim 35 wherein each detection unit comprises a spherical lens.
37. The system as in claim 35 wherein each detection unit comprises a spherical charge-coupled device.
38. The system as in claim 35 wherein each detection unit is adapted to detect live, three-dimensional images over a substantially 360°×360° range of angles.
39. The system as in claim 35 wherein each detection unit is adapted to detect the images in a visible spectrum.
40. The system as in claim 35 wherein each detection unit is adapted to detect the images in an infrared spectrum.
41. The system as in claim 35 wherein each detection unit is adapted to detect the images in an ultra-violet spectrum.

42. The system as in claim 35 wherein each detection unit comprises a holographic detection unit.

43. The system as in claim 35 wherein each detection unit is adapted to convert a detected image into image and positioning data.

44. The system as in claim 35 wherein each detection unit is adapted to convert a detected image into image and positioning data and is further adapted to transmit the image and positioning data to a processing unit.

45. The system as in claim 44 wherein each detection unit is adapted to wirelessly transmit the image and positioning data to the processing unit.

46. The system as in claim 44 wherein each detection unit is adapted to optically transmit the image and positioning data to the processing unit.

47. The system as in claim 46 wherein each detection unit is adapted to optically transmit the image and positioning data to the processing unit with substantially no delay.

48. The system as in claim 35 further comprising at least one compensation section adapted to estimate image and positioning data corresponding to a blind spot for each detection unit.

49. The system as in claim 35 further comprising at least one processing unit adapted to generate live, three-dimensional composite video signals from the detected images.

50. The system as in claim 49 wherein the at least one processing unit comprises at least one image processor adapted to generate three-dimensional image data from the detected images.

51. The system as in claim 50 wherein the at least one image processor is further adapted to generate three-dimensional image data from the detected images which represents RE and LE image data.

52. The system as in claim 50 wherein the at least one image processor comprises at least one three-dimensional parallax interpreter adapted to generate RE and LE image data.

53. The system as in claim 49 wherein the at least one processing unit comprises at least one positioning processor adapted to generate positioning data corresponding to the detected images.

54. The system as in claim 53 wherein the at least one positioning processor comprises at least one viewpoint bias controller adapted to generate the positioning data from positioning angles.

55. The system as in claim 53 wherein the at least one positioning processor comprises at least one filter adapted to filter out horizontal or vertical positioning data associated with RE and LE images of the detected images.

56. The system as in claim 53 wherein the at least one positioning processor comprises at least one first filter adapted to filter out horizontal positioning data associated with RE and LE images and at least one second filter to filter out vertical positioning data associated with the RE and LE images.

57. The system as in claim 56 wherein the at least one first and second filters comprise window apertures.

58. The system as in claim 49 wherein the at least one processing unit comprises at least one integrator adapted to link positioning data to RE and LE image data based on the detected images.

59. The system as in claim 49 wherein the at least one processing unit comprises at least one image sweep generator adapted to generate first, unformatted live 3-D video signals based on the detected images.

60. The system as in claim 59 wherein the at least one processing unit further comprises at least one positioning sweep generator adapted to generate second, unformatted live 3-D video signals from the first, unformatted video signals.

61. The system as in claim 60 wherein the at least one processing unit is further adapted to generate the second, unformatted video signals based on a range of points associated with the detected images.

62. The system as in claim 61 wherein the at least one processing unit further comprises at least one resolution control section adapted to select the range of points.

63. The system as in claim 62 wherein the at least one resolution control section is adapted to select the range of points based on stored reference point data.

64. The system as in claim 49 wherein the at least one processing unit further comprises at least one resolution control section adapted to control at least one resolution of generated, live three-dimensional images based on the detected images.

65. The system as in claim 61 wherein the at least one processing unit further comprises at least one video formatting section adapted to format the second, unformatted video signals.

66. The system as in claim 49 wherein the at least one processing unit further comprises at least one video formatting section adapted to format live, three-dimensional video signals based on the detected images.

67. The system as in claim 65 further comprising at least one display adapted to display live, three-dimensional parallax images based on the formatted video signals.

68. The system as in claim 35 further comprising at least one display adapted to display live, three-dimensional parallax images based on the detected images.

69. A method for generating a live, three-dimensional parallax video signal comprising:
 detecting a live, three-dimensional image using a single, substantially spherical charge-coupled detection unit.

70. The method as in claim 69 further comprising spherically detecting the three-dimensional image.

71. The method as in claim 69 further comprising detecting live, three-dimensional images over a substantially 360°×360° range of angles.

72. The method as in claim 69 further comprising detecting the image in a visible spectrum.

73. The method as in claim 69 further comprising detecting the image in an infrared spectrum.

74. The method as in claim 69 further comprising detecting the image in an ultra-violet spectrum.

75. The method as in claim 69 further comprising holographically detecting the detected image.

76. The method as in claim 69 further comprising converting the detected image into image and positioning data.

77. The method as in claim 69 further comprising converting the image into image and positioning data and transmitting the image and positioning data to a processing unit.

78. The method as in claim 77 further comprising wirelessly transmitting the image and positioning data to the processing unit.

79. The method as in claim 77 further comprising optically transmitting the image and positioning data to the processing unit.

80. The method as in claim 79 further comprising optically transmitting the image and positioning data to the processing unit with substantially no delay.

81. The method as in claim 69 further comprising estimating image and positioning data corresponding to a blind spot.

82. The method as in claim 69 further comprising generating a live, three-dimensional video signal from the detected image.

83. The method as in claim 69 further comprising generating three-dimensional image data from the detected image.

84. The method as in claim 83 further comprising generating three-dimensional image data from the detected image which represents RE and LE image data.

85. The method as in claim 69 further comprising generating positioning data corresponding to the detected image.

86. The method as in claim 85 further comprising generating the positioning data from positioning angles.

87. The method as in claim 85 further comprising filtering out horizontal or vertical positioning data associated with RE and LE images of the detected image.

88. The method as in claim 85 further comprising filtering out horizontal positioning data associated with RE and LE images and filtering out vertical positioning data associated with the RE and LE images.

89. The method as in claim 85 further comprising linking positioning data to RE and LE image data based on the detected image.

90. The method as in claim 69 further comprising generating a first, unformatted live 3-D video signal based on the detected image.

91. The method as in claim 90 further comprising generating a second, unformatted live 3-D video signal from the first, unformatted video signal.

92. The method as in claim 91 further comprising generating the second, unformatted video signal based on a range of points associated with the detected image.

93. The method as in claim 92 further comprising selecting the range of points.

94. The method as in claim 93 further comprising selecting the range of points based on stored reference point data.

95. The method as in claim 82 further comprising controlling a resolution of a generated, live three-dimensional image based on the detected image.

96. The method as in claim 91 further comprising formatting the second, unformatted video signal.

97. The method as in claim 69 further comprising formatting a live, three-dimensional video signal based on the detected image.

98. The method as in claim 97 further comprising displaying a live, three-dimensional parallax image based on the formatted video signal.

99. The method as in claim 69 further comprising displaying a live, three-dimensional parallax image based on the detected image.

100. A method for generating live, three-dimensional parallax video signals comprising:
    detecting live, three-dimensional parallax images using a plurality of substantially spherical charge-coupled detection units wherein each unit detects a 3-D image.

101. The method as in claim 100 further comprising spherically detecting the live, three-dimensional images.

102. The method as in claim 100 further comprising detecting live, three-dimensional images over a substantially 360°×360° range of angles.

103. The method as in claim 100 further comprising detecting the images in a visible spectrum.

104. The method as in claim 100 further comprising detecting the images in an infrared spectrum.

105. The method as in claim 100 further comprising detecting the images in an ultra-violet spectrum.

106. The method as in claim 100 further comprising holographically detecting the images.

107. The method as in claim 100 further comprising converting the detected images into image and positioning data.

108. The method as in claim 100 further comprising converting the detected images into image and positioning data and transmitting the image and positioning data to a processing unit.

109. The method as in claim 108 further comprising wirelessly transmitting the image and positioning data to the processing unit.

110. The method as in claim 108 further comprising optically transmitting the image and positioning data to the processing unit.

111. The method as in claim 110 further comprising optically transmitting the image and positioning data to the processing unit with substantially no delay.

112. The method as in claim 100 further comprising estimating image and positioning data corresponding to blind spots.

113. The method as in claim 100 further comprising generating live, three-dimensional video signals from the detected images.

114. The method as in claim 113 further comprising generating three-dimensional image data from the detected images.

115. The method as in claim 114 further comprising generating three-dimensional image data from the detected images which represents RE and LE image data.

116. The method as in claim 113 further comprising generating positioning data corresponding to the detected images.

117. The method as in claim 116 further comprising generating the positioning data from positioning angles.

118. The method as in claim 116 further comprising filtering out horizontal or vertical positioning data associated with RE and LE images of the detected images.

119. The method as in claim 116 further comprising filtering out horizontal positioning data associated with RE and LE images and filtering out vertical positioning data associated with the RE and LE images.

120. The method as in claim 113 further comprising linking positioning data to RE and LE image data based on the detected images.

121. The method as in claim 113 further comprising generating first, unformatted live 3-D video signals based on the detected images.

122. The method as in claim 121 further comprising generating second, unformatted live 3-D video signals from the first, unformatted video signals.

123. The method as in claim 122 further comprising generating the second, unformatted video signals based on a range of points associated with the detected images.

124. The method as in claim 123 further comprising selecting the range of points.

125. The method as in claim 124 further comprising selecting the range of points based on stored reference point data.

126. The method as in claim 113 further comprising controlling at least one resolution of generated, live three-dimensional images based on the detected images.

127. The method as in claim 122 further comprising formatting the second, unformatted video signals.

128. The method as in claim 100 further comprising formatting live, three-dimensional video signals based on the detected images.

129. The method as in claim 127 further comprising displaying live, three-dimensional parallax images based on the formatted video signals.

130. The method as in claim 100 further comprising displaying live, three-dimensional parallax images based on the detected images.

131. The device as in claim 1 wherein the device comprises a three-dimensional camera.

132. The system as in claim 35 wherein the system comprises at least one three-dimensional camera.

* * * * *